April 29, 1924.

J. S. LANG

SHOCK ABSORBER

Filed June 2, 1922

1,492,329

INVENTOR
James S. Lang
BY

Patented Apr. 29, 1924.

1,492,329

UNITED STATES PATENT OFFICE.

JAMES S. LANG, OF WATERTOWN, MASSACHUSETTS.

SHOCK ABSORBER.

Application filed June 2, 1922. Serial No. 565,465.

*To all whom it may concern:*

Be it known that I, JAMES S. LANG, of Watertown, in the county of Middlesex and State of Massachusetts, a citizen of the United States, have invented a new and useful Improvement in Shock Absorbers, of which the following is a full, clear, and exact description, reference being had to the accompanying drawings, forming a part of this specification, in explaining its nature.

The present invention belongs to that class of shock absorbers which are especially adapted for motor vehicles, and in which the force required to pass a fluid through a constricted opening is utilized to prevent excessive vibration or rebound.

The object of the invention is to provide a generally improved shock absorber embodying means for automatically varying the area of the openings or passages through which the fluid is forced, and therefore the amount of force brought into play whenever such variation in the amount of force is required to effectually check the vibration or rebound of the vehicle body. It is also my object to provide a shock absorber having extreme sensitiveness and of relatively few parts.

The invention can best be seen and understood by reference to the drawings in which a shock absorber embodying the invention is shown, and in which—

Fig. 4 is a vertical section of a detail of construction later to be referred to.

Referring to the drawings:—

Figure 1:
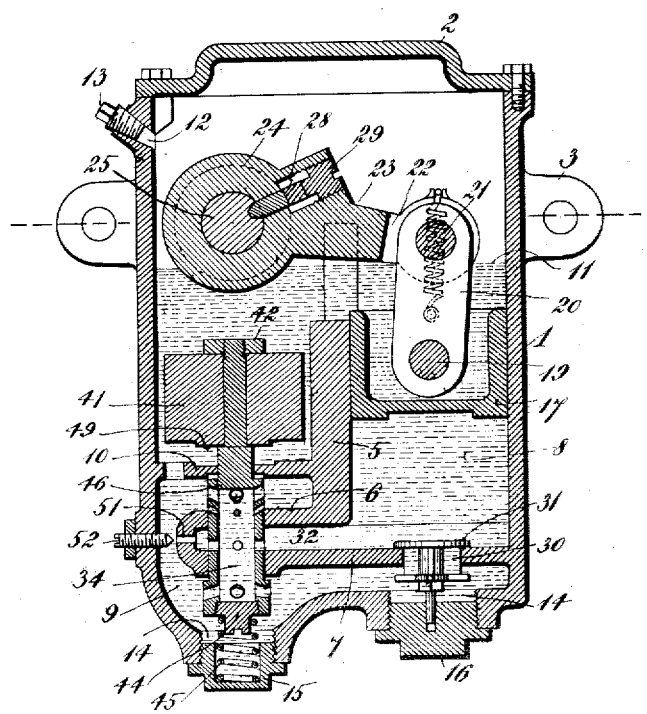
Figure 1 is a medial vertical cross section.

1 represents a casing having a removable cover 2. Projecting laterally from the casing are lugs or ears 3 by which it may be secured to the body or framework of a vehicle. On the inside the casing is provided with spaced bearings 4 for a rock shaft later to be referred to. The interior of the casing is also provided with various members or partitions 5, 6, 7, respectively, which provide within it a compression chamber 8, and outside this chamber immediately adjacent thereto a secondary or expansion chamber 9, with openings between the two chambers, certain of the partitions assisting in the valvular control of said openings. There is also provided a bridging member 10 acting as a support and stop for a valve later to be mentioned.

The casing forms a receptacle for oil contained within its respective chambers and maintained within the casing at about the level indicated at 11. Oil is introduced into the casing at the top by way of the inlet 12, closed by the filling plug 13. At the bottom the casing is provided with outlet openings 14, closed by plugs 15 and 16. These openings provide outlets for the oil and also openings through which the parts above may be machined and through which certain of the working parts may be introduced into the casing.

The compression chamber 8 is within a cylinder formed by the co-operation of the wall or partition 5 with the walls of the casing. Contained to reciprocate within the cylinder is a piston 17. The piston is provided with interior cheeks 18 within which a pin 19 is fixed to cross the space between the cheeks. Pivotally secured to the pin is a link 20 which is also pivotally secured to a pin 21 fixed in the spaced ends 22 of a rocker arm 23. The rocker arm 23 is provided with a hub 24 secured to a rock shaft 25 which turns within the spaced bearings 4 in the casing above referred to, the hub 24 occupying the space between the bearings. The hub 24 is fastened upon the shaft 25 by means of a key 28 which is held tightly into its keyway by the set screw 29.

Either keyed upon the outer end of the shaft 25 or constructed integrally therewith is an external rocker arm 26 provided with a ball 27 for making a ball and socket connection with any suitable means (not shown) for connecting it to the axle of the vehicle.

With this arrangement of parts it will be seen that any change in the relative positions of the axle and vehicle frame or body due to inequalities in the roadway will act to move the piston 17, which is raised or lowered in the cylinder as the case may be.

Referring now to the means for controlling the passage of oil between the compression chamber 8 and the secondary or expansion chamber 9: The wall or partition 7 in the casing extends beneath the cylinder containing the compression chamber and forms the bottom wall of this chamber. Within the partition 7 at the lower end of the cylinder is located an opening 30 between the compression chamber and the secondary chamber which, as shown in Fig. 1, extends beneath the compression chamber. This opening is controlled by a valve 31 of a well known type which permits of a free flow of oil from the secondary chamber into the cylinder when the piston is raised, but prevents the passage of oil through the opening when the piston moves in a reverse direction.

Figure 3:
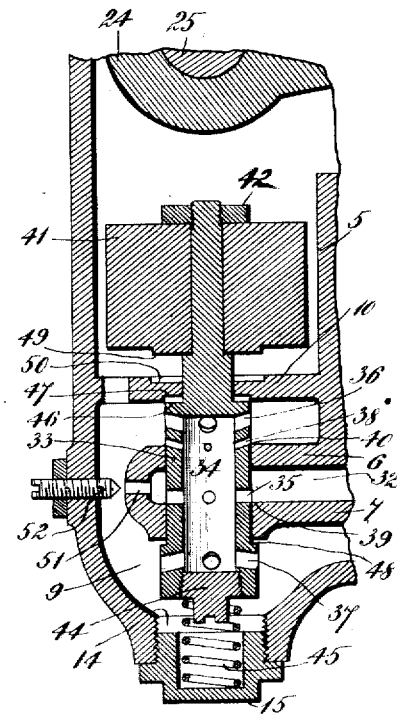
Fig. 3 is a vertical section on a larger scale showing certain parts shown in Fig. 1.
Figure 2:
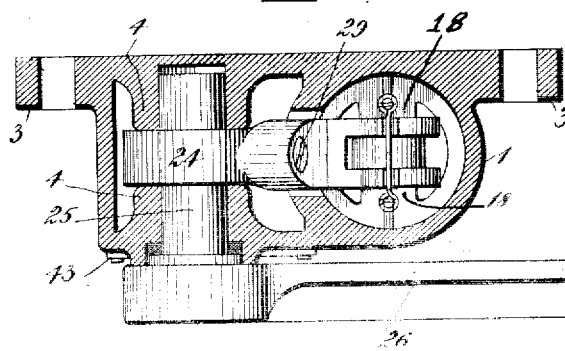
Fig. 2 is a horizontal section of the exterior casing and cylinder and view of interior part.
Figure 4:
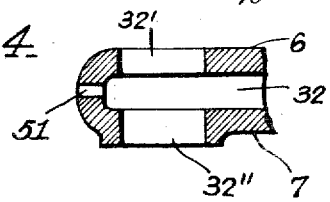

The partitions 6 and 7 co-operate with one another to form an extension passage 32 from the lower end of the compression chamber. The bridging support 10 and the partitions 6 and 7 are bored to provide an outlet from the compression chamber by way of openings 32', 32" oppositely arranged and which receive with a sliding fit a cylindrical valve 33, the bore of partitions 7 and 8 around the openings 32', 32" therein forming a valve seating. In its preferred form, as shown in Figs. 1 and 3, the valve 33 is provided with a hollow cylindrical space 34 forming a passageway for the transference of liquid from the compression space to the secondary chamber, and vice versa. Ports 35, 36, 37 and 38 are bored through the cylindrical walls of the valve. By means of these ports the passage of the liquid is controlled as movement of the valve takes place. In order that the valve may be free from friction and in perfect balance the ports 35, 36, 37 and 38 are spaced equally around the circumference of the valve. In its normal position, as shown in Fig. 3, there is free communication between the compression space 8 and the secondary chamber 9 by way of the wide open ports 35, the interior space 34 and the ports 36, 37 and 38. When the oil passes from the compression chamber 8 to the secondary chamber, entering the valve through ports 35, its path is divided in the valve space 34, one portion passing out by way of ports 36 and 38 and the other passing out by way of ports 37. In the preferred form shown the valve ports 35 are bored at right angles to the axis of the valve and the ports 36 and 37 at slightly less than right angles to the axis of the valve in opposite directions. The edge 39 of the valve seating at the upper surface of partition 7 forms a working valve edge in connection with the ports 35, closing the latter when the valve is depressed and opening them when the valve is raised. In a similar manner the edge 40 of the valve seating at the upper surface of the partition 6 forms a working valve edge in connection with the ports 38, closing the latter when depressed and opening them when raised.

The point of greatest resistance to the flow of fluid through the valve is at the ports 35, determined by the closing edge 39, and therefore the area of the ports 35 is made smaller than either ports 36 or 37 and much smaller than their aggregate area. Ports 36 and 37 are made of such size and angles that their capacities for the discharge of fluid, under the same pressures, are substantially equal. The combined capacity of ports 36 and 38 for discharge of fluid under the same pressure is therefore greater than that of the ports 37.

The valve is extended at its upper end to form a spindle which is shouldered to receive a weight 41 fastened upon it by means of a locknut 42 threaded thereon. In order to introduce the weight into the casing, the latter is provided with an opening on one side sufficiently large for the purpose, normally covered by a cover plate 43, after which the valve is inserted from below through openings 14.

At the lower end the valve cavity 34 is closed by a taper plug 44 which is also adapted to receive the end of a supporting spring 45. The lower end of the spring 45 is retained in a suitable socket formed in the closing plug 15, thereby supporting the valve and its attached weight in its normal position as shown. The valve and its attached weight supported in a state of balance upon its supporting spring 45 is free to move in a vertical direction in response to such forces as may be brought to bear upon it. A stop to limit the upward movement of the valve after it has passed its full open position is formed by the shoulder 46 coming into contact with the bridging support 10. There is also provided an auxiliary stop 48 which comes into contact with the lower side of partition 7. A stop is also provided to limit the downward movement of the valve after it has passed its closed position, by the weight 41 coming into contact with the upper side of bridging support 10.

When two metallic surfaces are brought sharply together there is liable to be a certain amount of rebound due to the elasticity of the metals. In order therefore to provide an inelastic impact thereby eliminating the rebound, provision is made for the retention of a film of oil between the striking surfaces. To this end the under side of support 10 is so counterbored that it will snugly fit the shoulder 46 of the valve, and the upper side of support 10 is also so counterbored that it will snugly fit a shoulder 49 carried by the weight 41. In operation the shoulder 46 or 49 enters its respective counterbore 47 or 50 and in displacing the imprisoned oil is eased against the bottom of the counterbore without objectionable rebound.

In addition to the passages 35, 36, 37 and 38 there is also provided a bypass 51 which may be adjusted to meet the requirements of vehicles of different weights by means of the needle valve 52. The fluid is able to pass from the compression space 8 through the bypass 51 without interference of the valve 33 since the passage 32 is wider than the diameter of the valve 33 thus permitting a free passage around it.

Reference will now be made to the effect upon the valve 33 of the flow of fluid through it.

As before intimated, the valve when unaffected by other forces takes its position as shown in Figs. 1 and 3 in a state of substantially static suspensional balance upon its supporting spring 45 in which position all its ports are open. If desired the valve may be made to rest against its stops 47 and 48. Assuming now that a flow of liquid takes place from compression chamber 8 by way of passage 32, ports 35, cavity 34 and ports 36, 37 and 38 to the secondary chamber 9, this being brought about by a difference of the pressures in chambers 8 and 9, respectively. Inasmuch as the aggregate area of ports 36, 37 and 38 is in excess of the area of ports 35, the point of maximum resistance to flow will be at ports 35, and consequently the pressure of the liquid inside the valve cavity 34 will be much less than in the chamber 8. There will, however, be an excess of pressure in cavity 34 over that in the secondary chamber 9 due to the resistance of ports 36, 37 and 38, the change in direction of flow, or in the present instance to both these causes. The pressure upon the upper end of the valve cavity 34 is lessened by the flow of fluid from the ports 36 and 38, and in the same manner the pressure upon the plug 44 bears an inverse relation to the freedom of exit through ports 37.

It will now be assumed that with the valve and its attached weight in its normal position a flow of liquid takes place through the valve creating a slight pressure in the valve cavity 34 and escaping from all the exit ports 36, 37 and 38. As the combined area of the ports 36 and 38 is greater than that of ports 37 there will be a larger flow through them resulting in a lower pressure upon the upper end of the cavity than upon the lower end at the plug 44. This excess of pressure at the lower end of the cavity will be superposed upon the effect of the weight 41 causing a slight depression of the valve with consequent compression of the supporting spring 45.

As the valve is depressed due to the flow of liquid, the valve edge 39 decreases the opening of the port 35 and the valve edge 40 decreases the opening of the port 38 until the latter is completely closed. When the valve is depressed sufficiently so that ports 38 are closed the liquid passing through the partially closed ports 35 escapes from the valve cavity by way of ports 36 and 37 which, as before stated, have an approximately equal discharge, resulting in an equal pressure being exerted upon the upper and lower ends of the valve cavity. From this position there is no further depression of the valve due to the liquid flow and the valve will remain in perfect dynamic suspensional balance upon its supporting springs. If the valve is depressed by other means below the point just indicated, the spring 45 will be further compressed and it will be returned to its former position as the spring overcomes the inertia of the weight 41.

It is thus seen that the effect of the flow of liquid through the valve tends to move it from its normal wide open position to one more nearly closed from which it may readily be either completely closed or widely opened.

The flow of liquid affecting the valve in the above manner is brought about by the movement of the piston 17 which by suitable means is connected with the vehicle axle. In this manner the movement of the vehicle axle is utilized to aid or supplement the action of the weight 41 and to whatever extent may be desired, by a proper proportioning of the parts.

Having described the effect upon the valve 33 of the fluid passing through it and the means by which it may be controlled, reference will now be made to the function of the weight 41 and its attached valve, without reference to the effect of the flow of the liquid through the latter already described.

The weight 41 and the attached valve 33 may be considered as one, with reference to the effects of their inertia. The weight 41 and attached valve 33 in normal position is supported by the spring 45 in static balance as shown in Figs. 1 and 3 or if desired resting against its stops 47 and 48. If depressed from this position and state the spring 45 will be compressed and upon release will return to its original position as the inertia of the weight and valve is overcome by the spring. If now the absorber casing 1 carrying the valve support 10, valve seatings 39 and 40 together with the spring supporting cap 15 be suddenly raised, the inertia of the weight, due to its considerable mass, will tend to cause it to lag behind the rise of the casing, compressing the spring 45 and resulting in a relative movement between the casing and the valve. This relative movement closes ports 38 and 35 successively. If the upward movement of the casing is not continued the compressed spring 45 will in turn overcome the inertia of the weight and valve, which will regain its original position reopening the ports 35 and 38 in succession.

The operation of the absorber is as follows: It will be assumed that all the parts of the shock absorber are in a normal position with the ports 35, 36, 37 and 38 all open, the piston occupying a position about midway of the cylinder, and that the vehicle with its axle in normal relation to the body encounters a road surface having a large number of small inequalities, not in themselves sufficient to cause a rebound. In passing over these inequalities the axle is rapidly vibrated up and down as it follows the contour of the ground, with a small range of movement. The rocker arm 23 and piston with it have a corresponding movement. Due to the fact that the flow of liquid through the valve is rapidly intermittent and to a slight extent reversed in direction on account of the lack of pressure in the compression chamber on the upward stroke of the piston, the comparatively heavy weight 41 is only slightly influenced by the flow and remains very slightly depressed and the valve remains nearly wide open, permitting a relatively free communication between the compression chamber 8 and the secondary chamber 9. This permits a free vibration of the piston without interfering with the resiliency of the springs.

It will now be assumed that the vehicle encounters a raised obstruction in the roadway having an abrupt rise succeeded by a corresponding decline and of sufficient height and width under ordinary circumstances to produce a violent rebound. The vehicle and shock absorber with it reaches the obstruction with all its parts as before in substantially normal positions, and as the wheels mount the rise the axle is brought nearer to the body of the vehicle compressing the vehicle springs. Simultaneously with the rise of the axle the hub 24 is turned lifting the rocker arm 23, which raises the piston in the cylinder, and oil is drawn into the compression chamber below the piston from the secondary chamber by way of the freely opening valve 31. If, as assumed above, the approach is quite abrupt followed by an immediate decline, the inertia of the vehicle body will prevent an appreciable rise of the vehicle body until the wheels have reached the top of the obstruction when an incipient rebound will begin. The vehicle body then rises slightly from its line of travel and simultaneously the axle begins to move away from the body as the wheels pass the horizontal crown, moving the piston downward in the cylinder and discharging oil through the ports 35, 36, 37 and 39. As heretofore explained, the discharge of the fluid through the valve results in a tendency to depress it. On this tendency of the valve to close, due to the discharge of oil through it, there is also superposed a force also tending to close it due to the inertia of the weight 41 in conjunction with the slight rise of the vehicle body in passing the obstruction. The effect of the two forces mentioned will quickly and completely close the valve ports 35 and 38 preventing any flow of oil through the valve. As the wheels pass over the crown of the rise therefore the vehicle springs will be held in a state of compression and the rebound prevented as the oil can only slowly escape from the compression chamber and by way of the bypass. As the wheels descend on the further side of the obstruction the weighted valve tends to regain its first position and the port 35 is partially opened. As the opening of the valve continues ports 38 are opened in succession resulting in a heavier pressure being exerted on the lower end of the valve cavity 34 than upon its upper end, tending to slow up its return and easing the impact of the valve against its upper stop.

A case the opposite to the preceding will now be considered, in which the vehicle passes a wide and deep depression in the roadway. The vehicle and shock absorber with it approaches as before with all its parts in substantially normal positions. Due to the inertia of the vehicle body, when the wheels go into the depression, the axle moves down and away from the vehicle body.

As this movement takes place the piston moves downward in the cylinder, the fluid passing out through ports 35, 36, 37 and 38 into the secondary chamber. The dynamic effect of the flow of fluid through the ports 38 tends to depress the valve as before shown. This action is, however, opposed by the inertia of the weight 41 due to the slight fall of the vehicle body with the result that the ports 35 remain nearly wide open permitting the fluid to pass with little resistance into the secondary chamber.

Due to the fact that the resistance to flow is slight the piston moves downward with comparative freedom allowing the vehicle springs to expand above their normal state of compression, thus maintaining the vehicle body at nearly its former level. As the wheels pass the bottom of the hollow, both ports 35 and 38 are open and the vehicle springs remaining expanded, maintain the vehicle body well up in position and the flow of fluid through the valve 33 ceases. The wheels now strike the rise on the opposite side of the hollow and the piston regains its normal position in the cylinder and the action in passing the top of the upward incline onto the level roadway beyond resembles somewhat that taking place in the case of the raised obstruction previously described.

In general terms then, the movement of the axle of the vehicle tends, by means of the liquid pressures brought about, to move the valve toward a position from which it may readily be closed or opened, and with the co-operation of the inertia of the weighted valve will close the said valve, but will not close it when opposed by said inertia.

The means shown are preferred in the sense that they are considered best fitted for accomplishing the purposes of the invention, although it is obvious that they may well be varied without departing from the spirit of the invention.

Having thus fully described my invention, I claim and desire to secure by Letters Patent of the United States:—

1. A fluid check shock absorber for controlling the movement of relatively movable parts, comprising separate elements attachable respectively to said parts, one of said elements consisting of a piston and the other of a pressure chamber in which the piston reciprocates, said pressure chamber having means therein for the circulation of a fluid upon the relative movement of said elements, and means governed partly by the fluid when compressed by the piston on the relative movement of said elements for checking circulation of the fluid.

2. A fluid check shock absorber for controlling the movement of relatively movable parts, comprising separate elements attachable respectively to said parts, one of said elements consisting of a piston and the other of a pressure chamber in which the piston reciprocates, said pressure chamber having means therein for the circulation of a fluid upon the relative movement of said elements, and means governed partly by the fluid when compressed by the piston on the relative movement of said elements and partly by said chambered element for checking circulation of the fluid.

3. A fluid check shock absorber for controlling the movement of relatively movable parts, comprising separate elements attachable respectively to said parts, one of said elements consisting of a piston and the other of a pressure chamber in which the piston reciprocates, said pressure chamber having means therein for the circulation of a fluid upon the relative movement of said elements, and means governed partly by the fluid when compressed by the piston on the relative movement of said elements and partly by its own inertia for checking circulation of the fluid.

4. A fluid check absorber for controlling the movement of relatively movable parts, comprising separate elements attachable respectively to said parts, one of said elements consisting of a piston and the other of a pressure chamber in which the piston reciprocates, said pressure chamber having means therein for the circulation of a fluid upon the relative movement of said elements, and means governed partly by the fluid when compressed by the piston on the relative movement of said elements, partly by said chambered element and partly by its own inertia for checking circulation of the fluid.

5. A fluid check shock absorber comprising an element consisting of a piston attachable to the axle of a vehicle, an element consisting of a pressure chamber attachable to the body of the vehicle and in which chamber the piston reciprocates, said pressure chamber having means for the circulation of a fluid therein upon the relative movement of said elements, and means governed partly by the fluid when compressed by the piston on the relative movement of said elements, partly by said chambered element and partly by its own inertia for checking circulation of the fluid.

6. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, an element consisting of a piston attachable to the other of said parts and reciprocable in said pressure chamber, and means controlled in part by the pressure of the fluid when compressed by the piston on the relative movement of said elements for checking circulation of the fluid through said outlet.

7. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, an element consisting of a piston attachable to the other of said parts and reciprocable in said pressure chamber, and means controlled in part by said chambered element and in part by the pressure of the fluid when compressed by the piston on the relative movement of said elements for checking circulation of the fluid through said outlet.

8. A fluid check shock absorber for controlling the movement of relatively movable parts comprising an element atachable to one of said parts and having a pressure chamber, said element being provided also with means permitting of the circulation of a fluid into and out of said chamber and consisting in part of a controllable outlet, an element consisting of a piston attachable to the other of said parts and reciprocable in said pressure chamber, and means controlled in part by its own inertia and in part by the pressure of the fluid when compressed by the piston on the relative movement of said elements for checking the circulation of the fluid through said outlet.

9. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, an element consisting of a piston attachable to the other of said parts and reciprocable in said pressure chamber, and means controlled in part by its own inertia, in part by said chambered element and in part by the pressure of the fluid when compressed by the piston on the relative movement of said elements for checking circulation of the fluid through said outlet.

10. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, an element consisting of a piston attachable to the other of said parts and reciprocable in said pressure chamber, a weighted valvular device for controlling said outlet to check circulation of fluid pressure, means for supporting and arranging said device from off said chambered element to occupy normally an open position relatively to said outlet, said device being adapted and arranged whereby it will be controlled in part by the pressure of the fluid when compressed by the piston on the relative movement of said elements and in part by its own inertia.

11. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, an element consisting of a piston attachable to the other of said parts and reciprocable in said pressure chamber, a weighted valvular device for controlling said outlet to check circulation of fluid therethrough, means for supporting and arranging said device from off said chambered element to occupy normally an open position relatively to said outlet, said device being adapted and arranged also whereby it will assist in the control of said outlet by its own inertia and preliminary to the closing of the outlet will be moved to a partially closed position by the pressure of the fluid when compressed by the piston on the relative movement of said elements.

12. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, an element consisting of a piston attachable to the other of said parts and reciprocable in said pressure chamber, a weighted valvular device for controlling said outlet to check circulation of fluid therethrough, means for supporting and arranging said device from off said chambered element to occupy normally an open position relatively to said outlet, said device having openings therein permitting of the passage of the fluid therethrough, when the device is occupying its normal open position as aforesaid, said openings being arranged whereby the pressure of the fluid when compressed by the piston on the relative movement of said elements will move said device to a determinate position and maintain it in such position where the inertia of the device will assist in the closing of said outlet.

13. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a weighted valvular member for controlling said outlet, said member being adapted and arranged whereby the fluid out of said pressure chamber when compressed by the piston will be directed to pass through said outlet in opposite directions when the member is open and means for yieldingly supporting said member in a normally open position.

14. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a hollow weighted valve controlling said outlet, said valve having a valve cavity with openings into and out of said cavity arranged whereby fluid from out of the pressure chamber when compressed by the piston will be directed to enter and pass through said valve in opposite directions when the valve is open, and means for yieldingly supporting said valve in a normally open position.

15. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a hollow weighted valve controlling said outlet, said valve having a valve cavity with inlet and outlet openings into and out of said cavity, said inlet opening being intermediate the outlet openings and the outlet openings being arranged whereby fluid entering the valve will flow therethrough in opposite directions when the valve is open, and means for yieldingly supporting the valve in a normally open position.

16. A fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a hollow weighted valve controlling said outlet, said valve having a valve cavity with openings into and out of said cavity arranged whereby fluid will enter the valve from the pressure chamber when compressed by the piston and flow through the valve in opposite directions when the valve is open, said outlet openings in the valve being also so positioned and related that the fluid passing through the valve will operate to partially close said valve when open as aforesaid, and afterwards the valve being maintained in a position of substantial balance, and means for yieldingly holding said valve in a normally open position.

JAMES S. LANG.

DISCLAIMER.

1,492,329.—*James S. Lang,* Watertown, Mass. SHOCK ABSORBER. Patent dated April 29, 1924. Disclaimer filed October 24, 1925.
Hereby enters this disclaimer to the said claims 1, 2, 6, and 7 of said patent.
[*Official Gazette November 24, 1925.*]